United States Patent
Ogawa et al.

(10) Patent No.: US 6,508,636 B2
(45) Date of Patent: Jan. 21, 2003

(54) FREON COMPRESSOR

(75) Inventors: Takashi Ogawa, Ota (JP); Hideaki Kato, Tanuma-Machi (JP); Tetsuo Nomoto, Meiwa-Machi (JP); Yuuichi Izawa, Ojima-Machi (JP)

(73) Assignee: Sanyo Electric Co., Ltd., Gunma-ken (JP)

( * ) Notice: Subject to any disclaimer, the term of this patent is extended or adjusted under 35 U.S.C. 154(b) by 116 days.

(21) Appl. No.: 09/761,924

(22) Filed: Jan. 17, 2001

(65) Prior Publication Data

US 2001/0026764 A1 Oct. 4, 2001

(30) Foreign Application Priority Data

Mar. 30, 2000 (JP) ........................ 2000-094303

(51) Int. Cl.⁷ ............................ F04B 17/00; F04B 35/00
(52) U.S. Cl. ..................... 417/410.3; 388/816; 417/356
(58) Field of Search .............................. 417/410.3, 356, 417/366; 418/184, 63; 62/139; 388/816

(56) References Cited

U.S. PATENT DOCUMENTS

| 3,922,114 A | * | 11/1975 | Hamilton et al. | ........... 417/366 |
| 4,015,182 A | * | 3/1977 | Erdman | ...................... 388/816 |
| 4,255,100 A | * | 3/1981 | Linder | ......................... 418/184 |
| 4,384,828 A | * | 5/1983 | Rembold et al. | ........... 417/356 |
| 4,700,548 A | * | 10/1987 | Roche et al. | ................. 62/139 |
| 2001/0043879 A1 | * | 11/2001 | Sunaga et al. | ................ 418/63 |

FOREIGN PATENT DOCUMENTS

JP      407099800 A   *   4/1995   ........... H02P/21/00

* cited by examiner

Primary Examiner—Teresa Walberg
Assistant Examiner—Leonid Fastovsky
(74) Attorney, Agent, or Firm—J. C. Patents

(57) ABSTRACT

A freon compressor comprises a compressor device and an electromotor device. The electromotor device is used for driving the compressor device and consists of a stator and a rotor rotating within the stator. The stator further consists of a stator core and stator windings wired on the stator core, and a three-phase sine alternating current waveform is applied to the stator windings. Therefore, the magnetic lines of force of the electromotor device are stabilized in space and time and noise is significantly reduced.

18 Claims, 12 Drawing Sheets

FREON COMPRESSOR

CROSS-REFERENCE TO RELATED APPLICATION

This application claims the priority benefit of Japanese application serial no. 2000-094303, filed on Mar. 30, 2000.

BACKGROUND OF THE INVENTION

1. Field of the Invention

This invention relates in general to a freon compressor used for devices such as air-conditioners, refrigerators, showcases or vending machines for juice etc.

2. Description of Related Art

Electromotor devices composed of a direct current (DC) motor are installed within freon compressors used for devices such as air-conditioners, refrigerators, or showcases. The electromotor device consists of a stator and a rotor, and stator windings are wired on the stator. The rotor is then rotated by applying voltages on the stator windings, thereby the electromotor device is driven to operate the freon compressor. FIGS. 13 and 14 show a conventional stator structure of an electromotor device. As shown in FIGS. 13 and 14, a number of teeth 102 are formed on the stator 101 in an equal distance manner, and stator windings 103 are wired across the teeth 102. FIG. 15 shows a distribution of the magnetic lines of force of the electromotor device. As shown in FIG. 15, the electromotive machine 100 serving as the electromotor device is a direct current (DC) motor, and there are four permanent magnets 105 arranged on the stator 104 in a substantially rectangular shape. The magnetic lines of force of each permanent magnet 105 pass through the teeth 102 in four directions, forming magnetic loops passing through the stator 101.

FIG. 16 shows a control circuit for the conventional electromotor device. As shown in FIG. 16, an alternating current (AC) power source is connected to a rectifier smoothing circuit 33 consisting of a rectifier diode D1 and a capacitor 35. The rectifier smoothing circuit 33 is further connected to an inverter circuit 36 consisting of a number of semiconductor switch devices, such as FET transistors SW1, SW2, SW3, SW4, SW5 and SW6. The outputs of the inverter circuit 36 are connected to the stator windings 103 of the electromotive machine 100 through three wirings 37, 38 and 39. Each of the wirings 37, 38 and 39 is respectively connected to a position detector 106 via a detecting circuit (not shown) that is used for voltages on the stator windings 103. In addition, the position detector 106 is further connected to the inverter circuit 36 through a tachometer 107 and an equi-width pulse width modulation (PWM) waveform generator 109. A conductive phase switch circuit 108 is connected between the position detector 106 and the inverter circuit 36.

The position detector 106 is used for detecting whether the wirings 37, 38 and 39 are applied voltages thereon by the inverter circuit 36, and then the rotation number of the rotor is calculated by the tachometer 107. According to the calculated rotation number, the equi-width PWM waveform generator 109 generates an equi-width PWM waveform to output to the inverter circuit 36. Afterwards, the inverter circuit 36 divides the equi-width PWM waveform into three phases (U phase, V phase and W phase) separated by 120 degrees, capable of respectively being transmitted on the wirings 37, 38 and 39. The inverter circuit 36 then outputs signals along two of the three wirings 37, 38 and 39, such that a magnetic field is generated on any one tooth 102 of the stator windings 103 for driving the electromotor 100 to operate the freon compressor. In addition, the conductive phase switch circuit 108 determines the outputs of the inverter circuit 36 based on the output of the position detector 105.

FIG. 17 shows operational modes of the electromotor. As shown in FIG. 17, the inverter circuit 36 outputs an equi-width PWM waveform (plus) using a KA1 mode to the U phase wiring (the wiring 37), and the equi-width PWM waveform (minus) to the V phase wiring (the wiring 38), by which a current is generated to flow along the black arrow and a magnetic force is generated along the white arrow. Next, the inverter circuit 36 outputs an equi-width PWM waveform (plus) using a KA2 mode to the U phase wiring (the wiring 38), and the equi-width PWM waveform (minus) to the W phase wiring (the wiring 39), by which a current is generated to flow along the black arrow and a magnetic force is generated along the white arrow.

Next, the inverter circuit 36 outputs an equi-width PWM waveform (plus) using a KA3 mode to the V phase wiring, and the equi-width PWM waveform (minus) to the W phase wiring, by which a current is generated to flow along the black arrow and a magnetic force is generated along the white arrow. The inverter circuit 36 outputs an equi-width PWM waveform (plus) using a KA4 mode to the V phase wiring, and the equi-width PWM waveform (minus) to the U phase wiring, by which a current is generated to flow along the black arrow and a magnetic force is generated along the white arrow. The inverter circuit 36 outputs an equi-width PWM waveform (plus) using a KA5 mode to the W phase wiring, and the equi-width PWM waveform (minus) to the U phase wiring, by which a current is generated to flow along the black arrow and a magnetic force is generated along the white arrow.

Next, the inverter circuit 36 outputs an equi-width PWM waveform (plus) using a KA6 mode to the W phase wiring, and the equi-width PWM waveform (minus) to the V phase wiring, by which a current is generated to flow along the black arrow and a magnetic force is generated along the white arrow. Accordingly, the magnetic force is sequentially rotated such that the rotor 104 is rotated. Thus, as shown in FIG. 18, a rotary magnetic field is generated in a manner that the circumference (an electric angle, equal to 360 degrees) is equally divided into six by releasing one of the three phases and then applying voltages on the other two phases for rotating the electromotor 100.

Therefore, according to the conventional method, the position detector is first used to detect a rotation position for detecting which one of the U-, V- and W-phases is released. For example, during the conductive status in the KA1 mode, only the magnetic field involving the rotor rotates, and the magnetic field involving the stator is not rotated, therefore, the distribution of the magnetic lines of force is more dense in space and time, causing a high magnetic flux of harmonic wave. The majority of noise results from this high magnetic flux of harmonic wave.

SUMMARY OF THE INVENTION

The object of this invention is to provide an electromotor device in which the distribution of the magnetic lines of forces are stabilized in space and time, and therefore to provide a freon compressor capable of significantly reduced noise.

Therefore, it is an objective of the present invention to provide a freon compressor. The freon compressor comprises a compressor device and an electromotor device. The electromotor device is used to drive the compressor device and consists of a stator and a rotor rotating within the stator. The stator further consists of a stator core and stator windings wired on the stator core, and a three-phase sine alternating current waveform is applied to the stator windings.

The rotor further comprises a rotor core and a plurality of permanent magnets formed within the rotor core. The permanent magnets are arranged in a substantially rectangular configuration. In addition, the permanent magnets can be also divided into four sets of parallel permanent magnets and these four sets of parallel permanent magnets are arranged on the rotor core. The rotor further comprises a rotor core and a plurality of permanent magnets arranged on the surface of the rotor core. The permanent magnets can be magnets made from rare-earth elements, or ferrite. The stator core further comprises at least six to twelve slots thereon, and the stator windings are directly wired on the slots. Freon absorbed and compressed by the compressor device comprises HFC freon or a natural freon. The compressor device comprises a rolling piston, a pump combining a pair of eddy devices, or a reciprocating piston. Furthermore, two to six magnetic poles can be formed in the rotor.

According to the present invention, the positions of the permanent magnets are not detected by a position sensor. As mentioned, the three-phase sine alternating current waveform is obtained by performing a quasi-sine wave pulse width modulation on a direct current (DC) power source. In addition, the three-phase sine alternating current waveform is obtained by superposing a third high harmonic wave thereon and then performing a quasi-sine wave pulse width modulation. The three-phase sine alternating current waveform is applied to control a torque for keeping a constant rotation speed of the rotor.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

Figure 1:
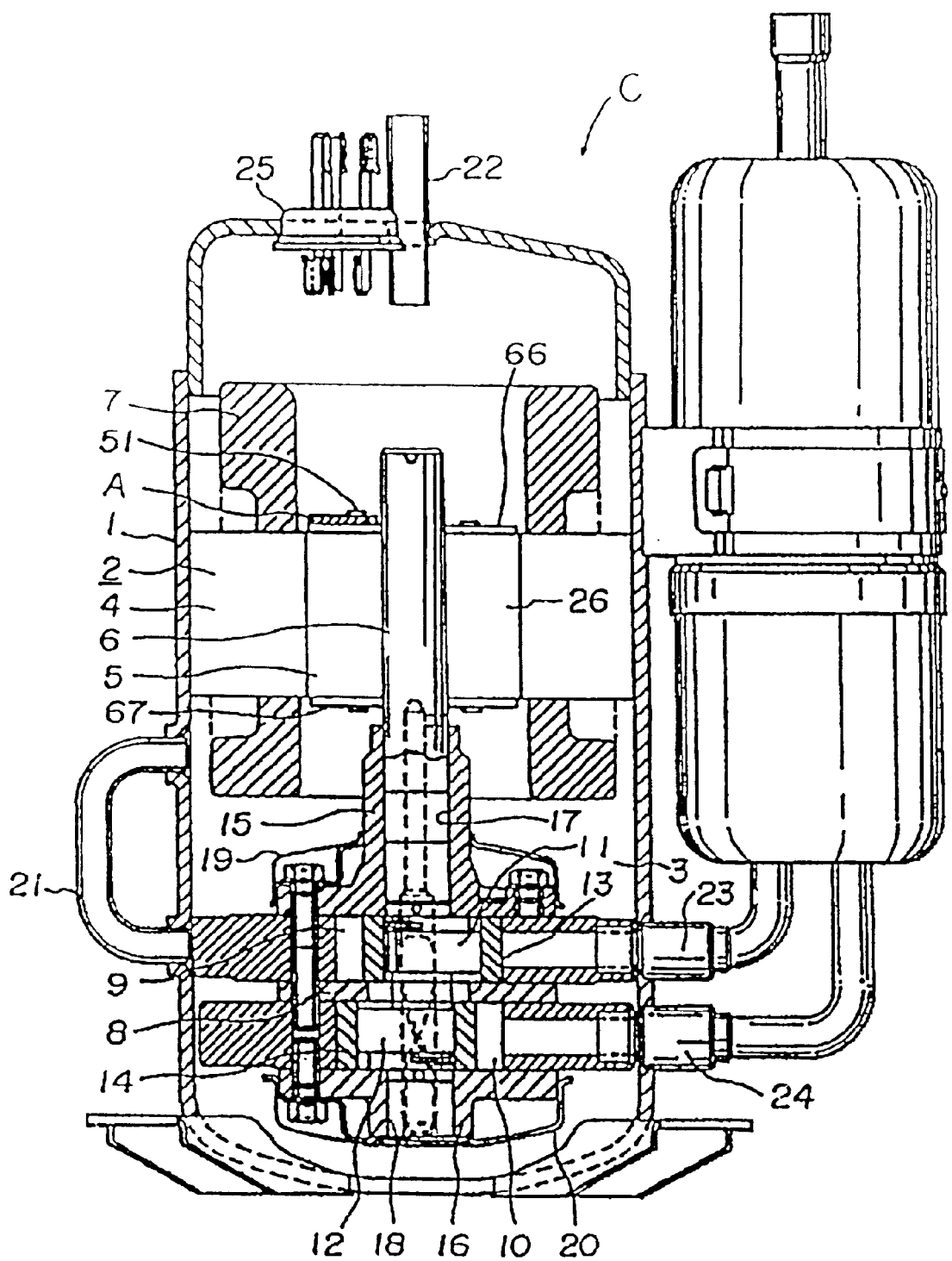
FIG. 1 is a side cross-sectional view of a freon compressor according to one preferred embodiment of the present invention.
Figure 2:
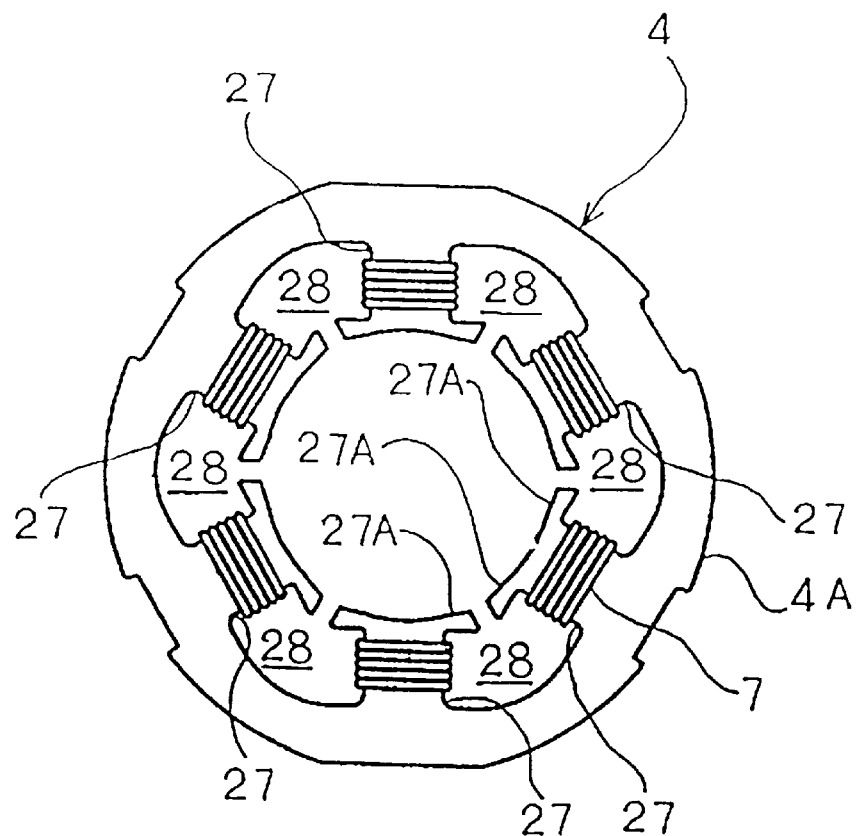
FIG. 2 is a plan view of a stator according to one preferred embodiment of the present invention.
Figure 3:
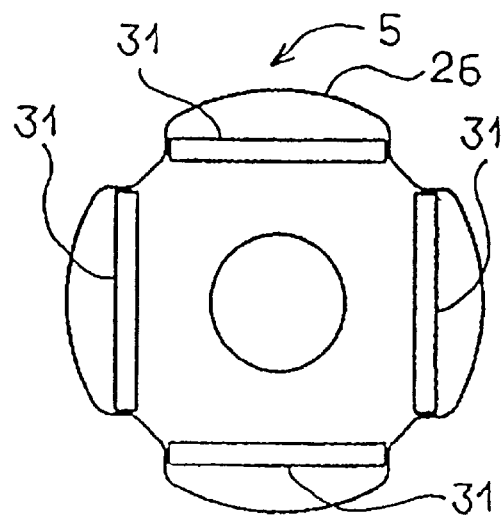
FIG. 3 is a plan view of a rotor according to one preferred embodiment of the present invention.
Figure 16:
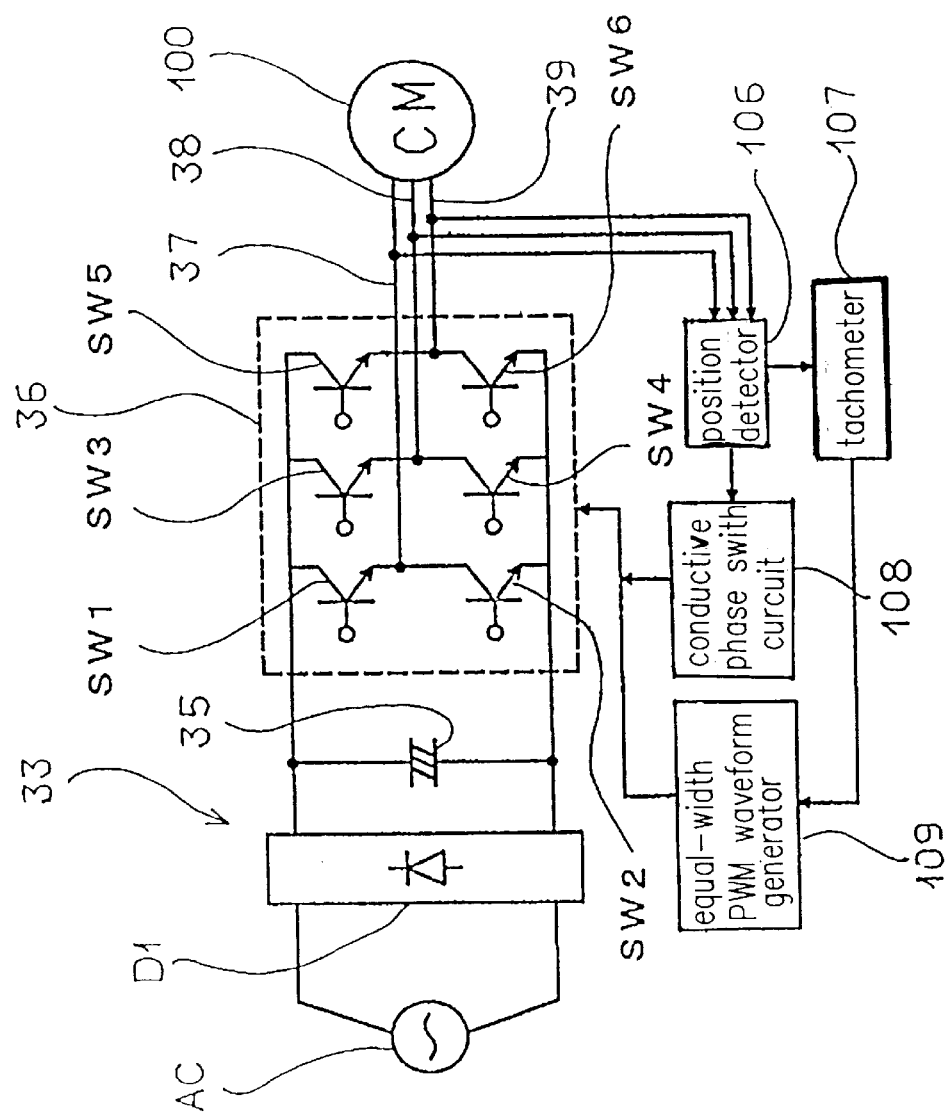
FIG. 16 is a conventional control circuit for the electromotor.
Figure 17:
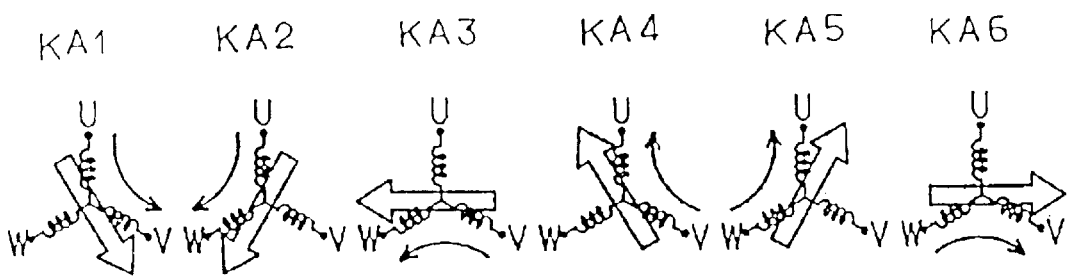
FIG. 17 shows rotational modes of the conventional electromotor.
Figure 18:
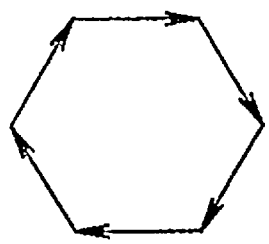
FIG. 18 shows a magnetic field generated by a conventional electromotor.

Following with the drawings, one preferred embodiment of the present invention is described. FIG. 1 shows a side cross-sectional view of a freon compressor C of the present invention. FIG. 2 is a plan view of a stator 4 and FIG. 3 is a plan view of a rotor 5 according to the present invention. In addition, the same numerals as in FIG. 16 represent the same elements. Referring to FIG. 1, numeral 1 is a sealed chamber. The upper portion within the sealed chamber 1 is used for installing an electromotive device, such as an electromotor 2, while the lower portion within the sealed chamber 1 is used for installing a compressor 3 driven by the electromotor 2. The sealed chamber 1 is predetermined to be divided into two portions. After the electromotor 2 and the compressor 3 are respectively installed on the upper and the lower portions within the sealed chamber 1, the sealed chamber 1 is sealed by high frequency adhesive.

The electromotor 2 consists of a stator 4 fixed on the inner wall of the upper portion of the sealed chamber 1 and a rotor 5 freely rotating centered at the shaft of the stator 4. In addition, the stator 4 further comprises stator windings 7 used for applying a rotary magnetic field to the rotor 5.

The compressor 3 comprises a first rotary cylinder 9 and a second rotary cylinder 10, both of which are separated by a central baffle plate 8. Each of the first and the second rotary cylinders 9, 10 are respectively installed on eccentric devices 11, 12 driven to rotate by the shaft 6 of the stator 4. The centers of the eccentric devices 11, 12 are different in 180 degrees with respect to the center of the shaft 6. Furthermore, only one rotary cylinder can be used in the compressor 3. In addition, a pump combined by a pair of eddy windings, a rolling piston or a reciprocating piston can be used to replace the rotary cylinder.

Numerals 13, 14 refer to a first roller and a second roller which are respectively rotated within the first and the second rotary cylinders 9, 10. Numerals 15, 16 respectively represent first and second retaining frames. The first retaining frame 15 together with the first rotary cylinder 9 between the first retaining frame 15 and the central baffle plate 8 forms a first sealed compressing space, similarly, the second retaining frame 16 together with the second rotary cylinder 10 between the first retaining frame 15 and the central baffle plate 8 forms a second sealed compressing space. In addition, shaft recessing holes 17, 18 are formed within the first and the second retaining frames 15, 16 such that the lower part of the shaft 6 of the stator 5 is capable of freely rotating therein.

Numerals 19, 20 are outlet mufflers, which respectively covers the first and the second retaining frames 15, 16. In addition, the rotary cylinder 9 together with the outlet muffler 15 are connected to a first outlet hole (not shown), while the rotary cylinder 10 together with the outlet muffler 16 are connected to asecond outlet hole (not shown). A bypass tube 21 is mounted on the external surface of the sealed chamber 1, and the bypass tube 21 is further connected internally to the outlet mufflers 19, 20.

In addition, a gas outlet 22 is installed on top of the sealed chamber 1. Inlet pipes 23, 24 are respectively connected to the first and the second rotary cylinders 9, 10. Furthermore, a sealing terminal 25 is formed on top of the sealed chamber 1 for providing electric power to the stator windings of the stator 4 via leads (not shown).

FIG. 2 schematically shows a plan view of the stator according to the present invention. Referring to FIG. 2, the stator core 4A is made of stator iron plates with substantially a donut shape, and the stacked stator iron plates form the stator core 4A. For example, the iron plates can be electromagnetic steel plates, such as silicon steel plates. The stator windings 7 are used for applying a magnetic field to the rotor 5 and are wired through insulating material (not shown).

Six teeth 27 are formed in equal distance on the inner circumstance of the stator core 4A. In addition, six slots 28 are formed between the teeth along the up and down directions of the stator 4. The front edge 27A of each tooth 27 extents along the outer rim of the rotor 5.

Through the insulating material, using the spacing of the slots 28 formed between the teeth 27, the stator windings 7 are directly wired on the teeth 27, referring to a convergent direct wiring method, to form the magnetic poles of the stator 4, by which a stator 4 with four poles and six slots is formed. Namely, the stator windings are directly wired on the stator core 4A. In addition, six to twelve slots can be formed on the stator core 4A, and the stator windings 7 of the stator 4 can be wired directly on the slots 28.

In FIG. 3, numeral 26 is a rotor core 26 of the rotor 5. A number of electromagnetic steel plates with thickness of about 0.3 mm to 0.7 mm are used to form rotor plates. The rotor plates are stacked and clasped to each other to integrally form the rotor core 26. In addition to the clasping method, a welding method can be used for integrally forming the rotor core 26. As shown in FIG. 1, numerals 66, 67 are retaining plates for retaining the rotor core 26 from its top and bottom. The retaining plates 66, 67 can be made of aluminum or resin material, which has substantially the same profile as the rotor plate. Capital A represents a balance weight, which together with the upper retaining plate 66 are fixed on the rotor core 26 by rivets 51.

A slot with a substantially rectangular shape (a rectangle centered at the shaft 6) is formed along the direction of the shaft 6. As shown in FIG. 3, four magnets (herein after, permanent magnets), which can be made of rare earth elements, are arranged in the slot. Moreover, the magnetic pole types of adjacent permanent magnets are different, and therefore form the quadrapole of the rotor 5.

Figure 4:
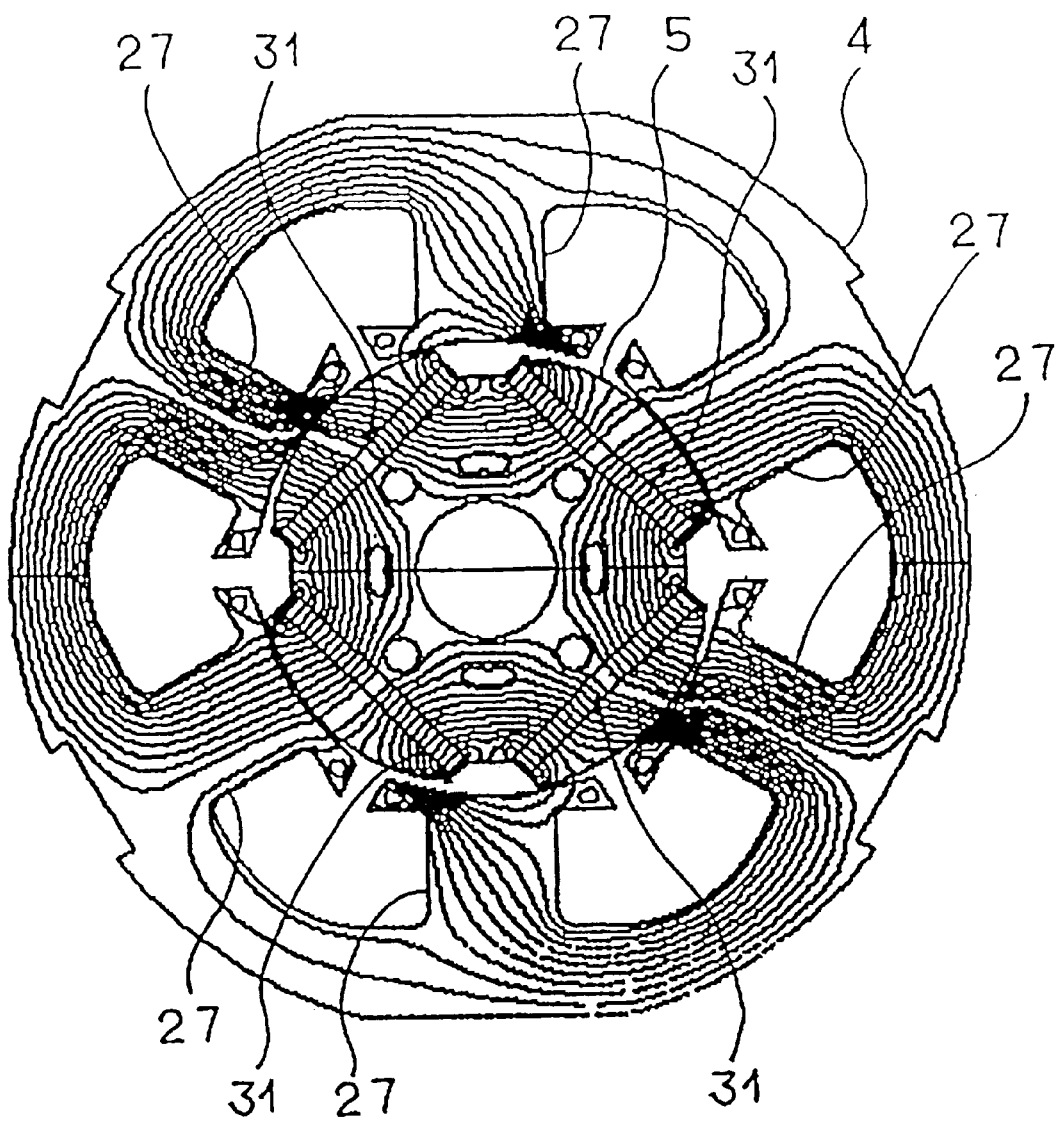
FIG. 4 shows a distribution graph of the magnetic lines of forces of an electromotor according to one preferred embodiment of the present invention.

FIG. 4 shows a distribution graph of the magnetic lines of forces of the electromotor 2. As shown in FIG. 4, the edge surface of two magnets 31 located at adjacent diagonal positions substantially correspond to the edge surfaces of adjacent teeth 27, and the ends of the permanent magnets 31 are located at the surface near to two adjacent teeth 27. The magnetic lines of forces out of the two adjacent magnets located at the diagonal positions pass through the two corresponding adjacent teeth 27 and then connect within the stator core 4A to form magnetic loops.

As shown in FIG. 4, the magnetic lines of force, out of each two adjacent permanent magnets 31 among the four permanent magnets 31 arranged in a rectangle within the rotor 5, pass through the corresponding two adjacent teeth 27, among the six teeth 27 installed in equal distance on the stator core 4A, to form a huge magnetic flux. As shown, huge magnetic lines of forces are formed to the left and right with respect to the drawing. The magnetic lines of force rotate as the rotor 5 rotates, and then move sequentially along the rotation direction of the rotor 5.

Figure 5:
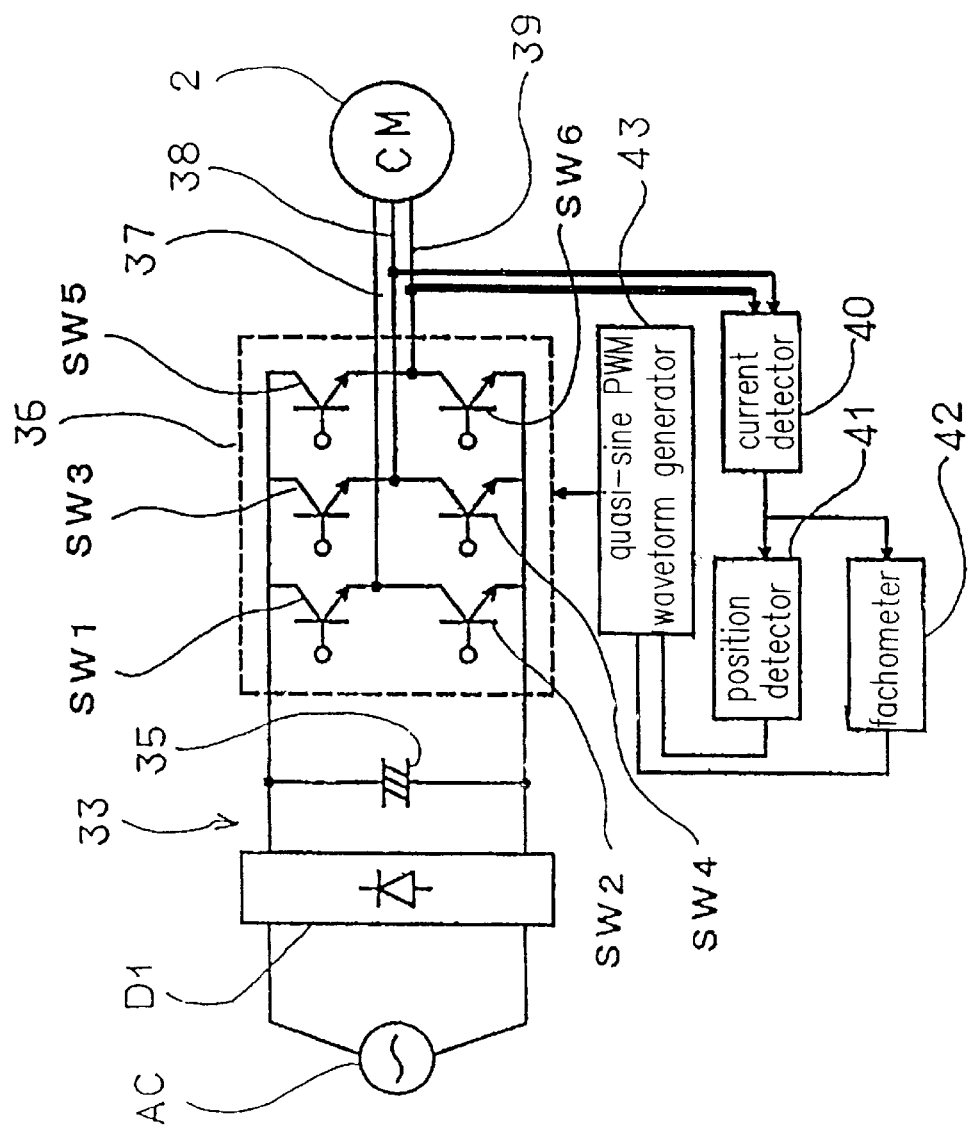
FIG. 5 is a control circuit for the electromotor according to one preferred embodiment of the present invention.
Figure 6:
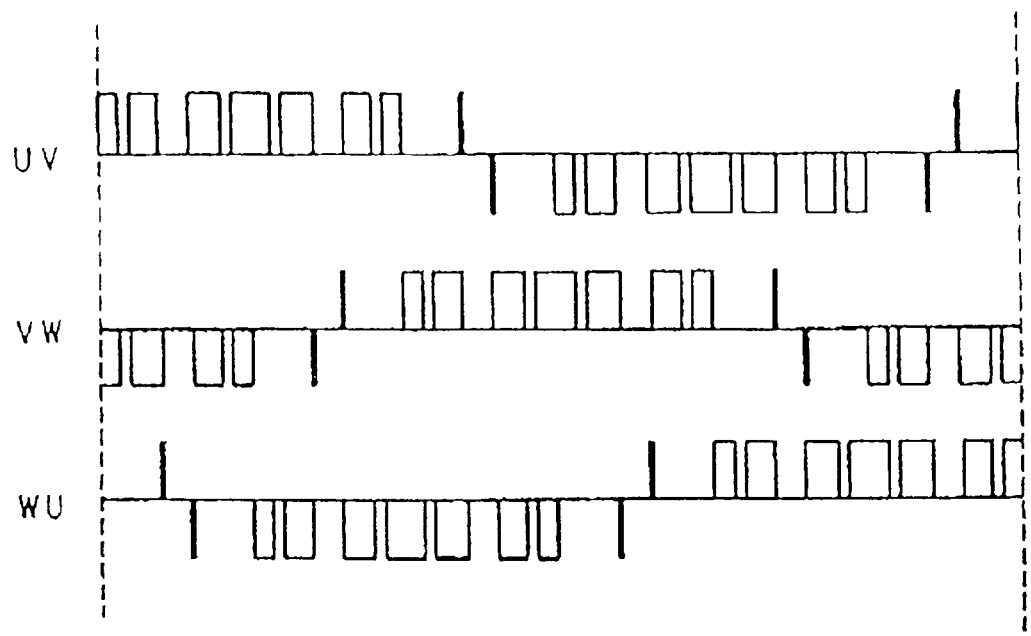
FIG. 6 is output waveforms of an inverter circuit according to one preferred embodiment of the present invention.
Figure 7:
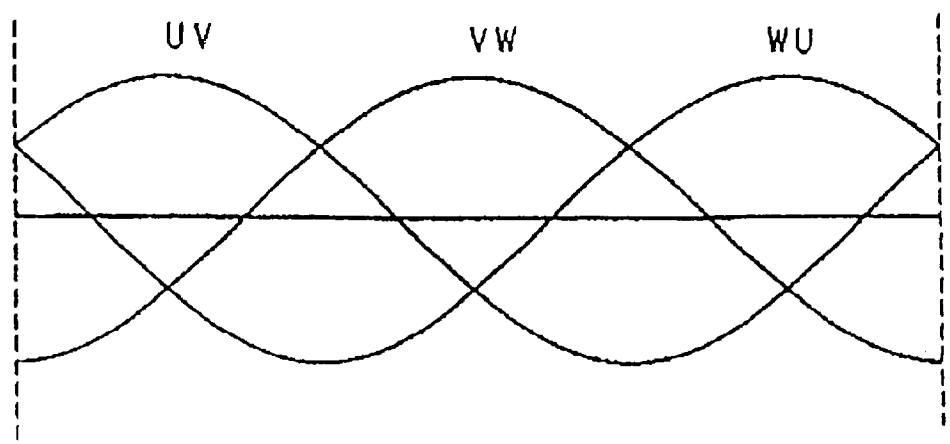
FIG. 7 is three-phase sine alternating current waveforms according to one preferred embodiment of the present invention.

FIG. 5 shows a control circuit of the electromotor 2 according to the preferred embodiment of the present invention. As shown in FIG. 5, the three-phase inverter circuit 36 consists of a number of semiconductor switch devices SW1, SW2, SW3, SW4, SW5 and SW6. The outputs of the inverter circuit 36 are connected to the stator windings 7 of the electromotor 2 (not shown) through three wirings 37, 38 and 39. Any two of the three wirings 37, 38 and 39 are further connected to inputs of a current detector 40. In the embodiment, the wirings 38 and 39 are connected to the inputs of the current detector 40. Furthermore, a position calculating circuit 41 and a tachometer 42 are connected in parallel to the outputs of the current detector 40. In addition, the current detector 40 can be designed to detect currents flowing through the wirings 37, 38 and 39.

The outputs of the position calculating circuit 41 and the tachometer 42 are then connected to the inverter circuit 36 through a quasi-sine wave PWM waveform generator 43. The inputs of the inverter circuit 36 are connected to a rectifying and smoothing circuit 33 consisting of a rectifier diode 34 and a capacitor 35. And the rectifying and smoothing circuit 33 is then in turn connected to an alternating current (AC) power source. The current detector 40, the position calculating circuit 41, the tachometer 42 and the quasi-sine wave PWM waveform generator 43 are generally a microcomputer.

A quasi-sine wave PWM waveform generated from the quasi-sine wave PWM waveform generator 43 is divided into three phases, the U-, V-, and W-phase, by the inverter circuit 36, and then the three phase waveforms are respectively transmitted to the wirings 37, 38 and 39 for outputting the quasi-sine wave PWM waveform, which interval is shortened in a predetermined time period. In this case, pulse waveforms with frequencies ranged from several KHz to several ten KHz are generated. The waveforms are then sequentially applied to the stator windings 7 wired on the teeth 27 for generating a circular rotary magnetic field with an approximate circular shape. The circular rotary magnetic field is operated together with the permanent magnets 31 assembled within the rotor core 26 such that the rotor 5 rotates.

The current detector 40 can detect currents or voltages on any two of the three wirings 37, 38 and 39 (current on the wirings 38, 39 are detected in this case). The position calculating circuit 41 then figures out the rotation position of the rotor 5 based on the outputs of the current detector 40.

The quasi-sine wave PWM waveform generator 43 generates a quasi-sine waveform with a predetermined pulse number based on the output signals of the position calculating circuit 41 and the tachometer 42. The quasi-sine wave PWM waveform from the quasi-sine wave PWM waveform generator 43 is then converted to the waveform with the predetermined pulse number by the semiconductor switch devices SW1- SW2- SW3- SW4- SW5- SW-6 of the inverter circuit 36, and then applied to the stator windings 7 wired on the teeth 27 of the stator 4. Namely, a three-phase sine wave AC waveform is a quasi-sine waveform, which is generated by applying a quasi-sine wave pulse width modulation on the DC power source from the rectifying and smoothing circuit 33 and then output from the inverter circuit 36. In addition, while performing the quasi-sine wave pulse width modulation, a third high harmonic wave can be further superposed on.

Next, the operation of the above mentioned structure is described in detail. Freon added in the freon compressor C can be a HFC freon or a natural freon. After the AC power source is rectified and smoothed by the rectifying and the smoothing circuit 33, the output of the quasi-sine wave PWM waveform generator 43 is converted to the three-phase sine wave AC waveform and then transmitted to the compressor 2, by which a circular rotary magnetic field with an approximate circular shape is generated on the stator 4 for rotating the rotor 5.

Figure 8:
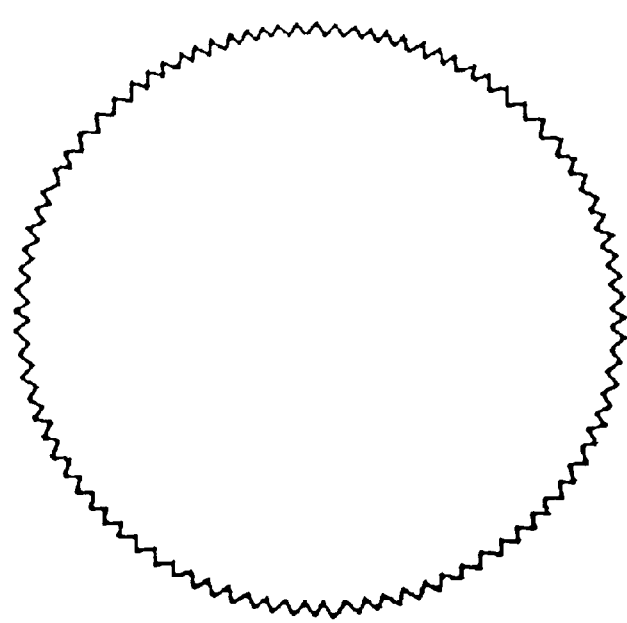
FIG. 8 schematically shows a magnetic field generated by a three-phase sine AC waveform according to the present invention.

According to the conventional method, the rotary magnetic field of the electromotor 2 divides the electric angle into six equal angles, causing the magnetic torque to vary too much. In contrast, according to the present invention, using the inverter circuit 36, the three-phase sine AC waveform is converted into pulse waveforms with frequencies ranging from several KHz to several ten KHz, by which a circular rotary magnetic field with an approximate circular shape as shown in FIG. 8 is generated. Therefore, the electromotor 2 operates smoothly and noise is significantly reduced.

In addition, the outputs of the inverter circuit 36 are applied to the three wirings 37, 38 and 39. The current detector 40 is capable of detecting the current on any two of the three wirings 37, 38 and 39. However, the current detector 40 can also detect all the currents flowing on the three wirings 37, 38 and 39.

Because the stator windings of the electromotor 2 are directly wired on the stator core 4A, and the three-phase sine wave AC waveform is applied on the stator windings 7, the circular rotary magnetic field with an approximate circular shape is generated within the electromotor 2. Therefore, the magnetic lines of force are stabilized in space and time, and the variation of the magnetic torque is reduced such that electromotor 2 operates smoothly and noise is significantly reduced.

Furthermore, the rotation and the rotary magnetic field are synchronized, therefore preventing non-uniform distribution of the magnetic lines of force in the electromotor 2. In addition, the permanent magnets 31 are made of rare earth elements or ferrite, by which strengthened magnetic lines of force can be formed in the rotor and the stator. Accordingly, an electromotor with high efficiency, high power and low noise can be fabricated.

When an HFC freon or a natural freon with high efficiency is added into the freon compressor C, even though the load of the electromotor 2 becomes larger, electromotor 2 operates smoothly because the circular rotary magnetic field with an approximate circular shape generated by the three-phase sine AC waveform is applied to electromotor 2. Accordingly, the noise is significantly reduced.

Furthermore, because the current detector 40 can detect currents on any two of the three wirings 37, 38 and 39 (current on the wirings 38, 39 are detected in this case), , no additional position detector is required to detect the position of the rotor 5. Accordingly, the structure of the freon compressor C can be further simplified.

According to the present invention, the current circuit 40 is used for detecting the position of the rotor, and therefore, even though the load torque of the electromotor per rotation is not constant due to freon absorbed and compressed in the freon compressor C, or due to the rotational speed of the rotor varying during rotation, the rotation speed of the electromotor 2 can be kept constant using the detected current from the current detector 40.

Figure 9:
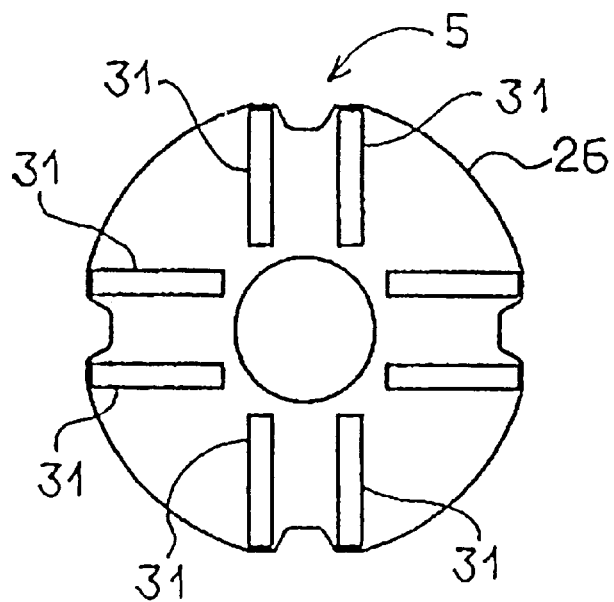
FIG. 9 is another exemplary structure of the rotor according to the present invention.

FIG. 9 shows another exemplary rotor structure. As shown, centered at the shaft 6, four pairs of permanent magnets 31 are arranged in a radial manner in four directions on the rotor core 26. Therefore, excellent and strengthened magnetic lines of forces are formed to pass through the rotor 5 and the stator 4.

Figure 10:
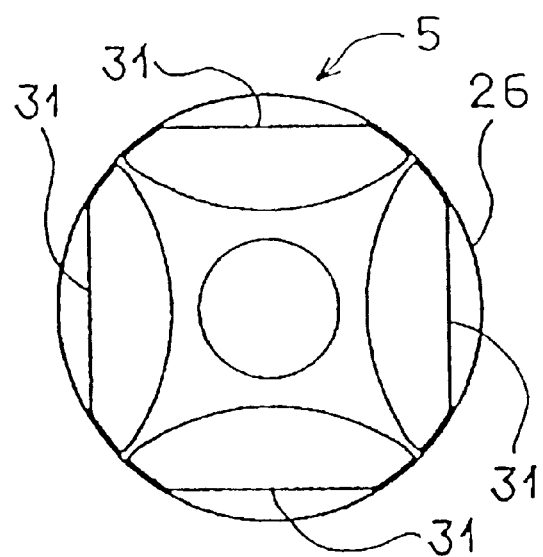
FIG. 10 is another exemplary structure of the rotor according to the present invention.

FIG. 10 shows another exemplary rotor structure. As shown, the permanent magnets 31 that are same as in FIG. 3 are arranged on the rotor core 26 of the rotor 5, except that the edge of each permanent magnet 31 facing the shaft 6 is a semicircular shape. Accordingly, the size of the permanent magnet 31 can be enlarged and the magnetic lines of forces passing through the stator 4 and the rotor 5 increased.

Figure 11:
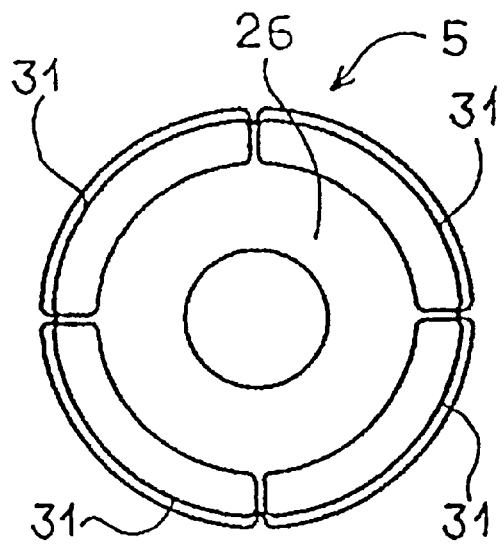
FIG. 11 is another exemplary structure of the rotor according to the present invention
Figure 12:
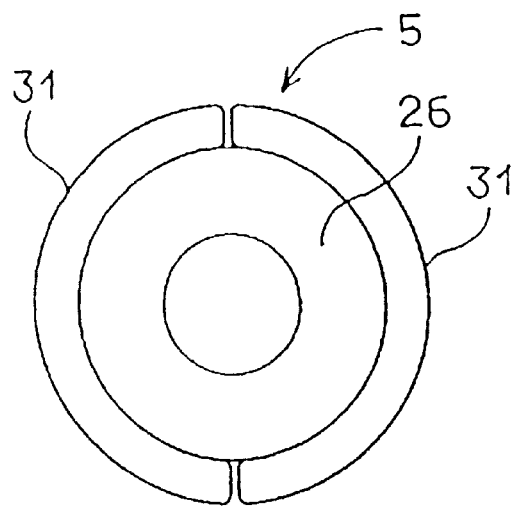
FIG. 12 is another exemplary structure of the rotor according to the present invention.
Figure 13:
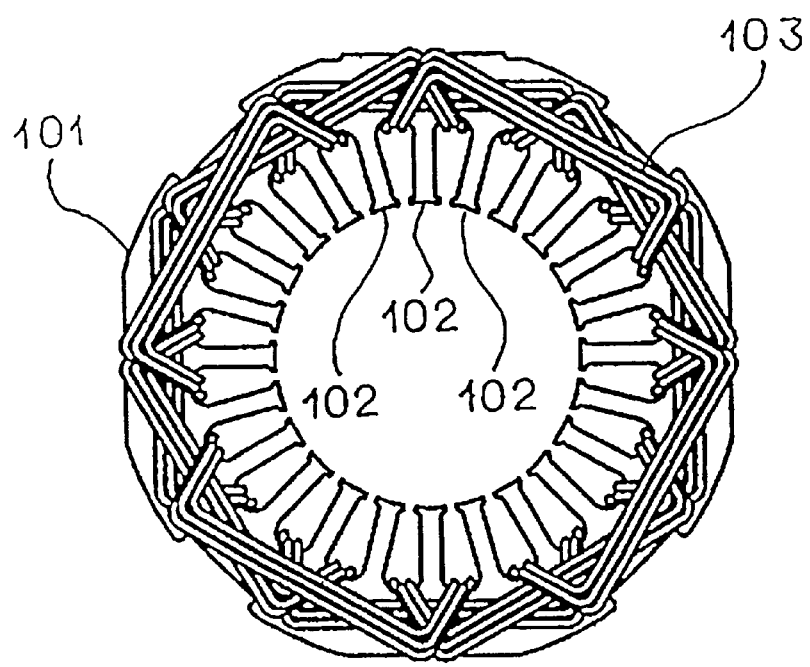
FIG. 13 shows a plan view of a conventional stator structure.
Figure 14:
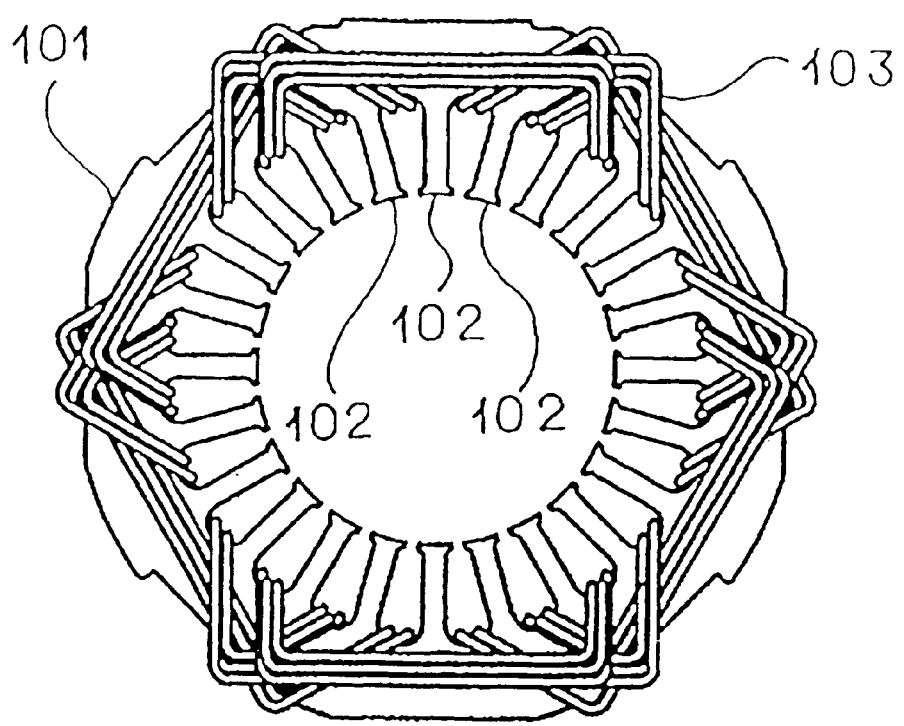
FIG. 14 shows a plan view of another conventional stator structure.
Figure 15:
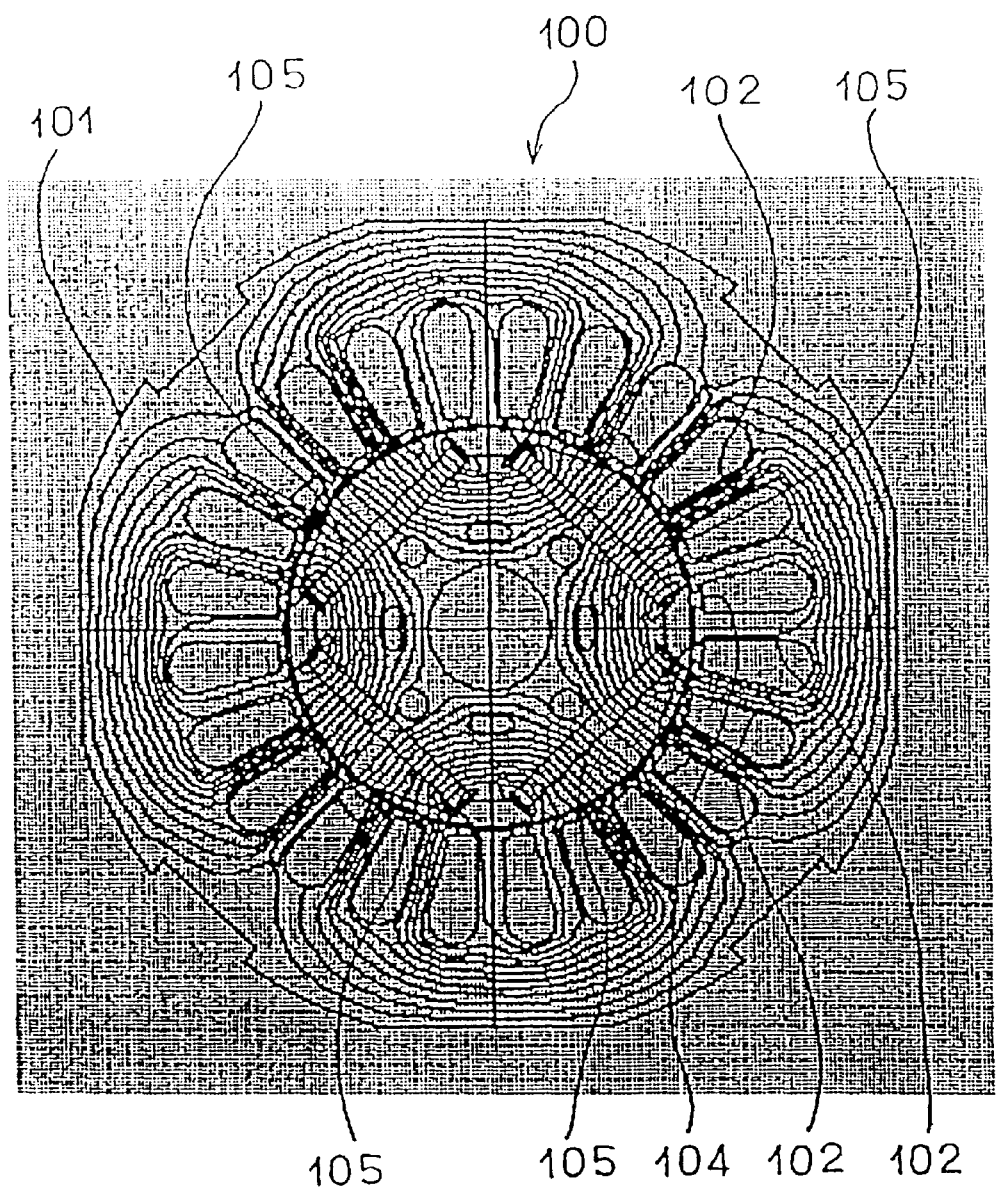
FIG. 15 shows a distribution graph of the magnetic lines of force of an electromotor of a conventional rotor structure.

FIG. 11 shows another exemplary rotor structure. As shown, four permanent magnets 31 are arranged along the rim of the circumference of the rotor core 31 of the rotor 5. In addition, FIG. 12 shows another exemplary rotor structure. As shown, two permanent magnets 31 with semicircular shape are arranged along the rim of the circumference of the rotor core 31 of the rotor 5. Therefore, excellent and strengthened magnetic lines of force are formed to pass through the rotor 5 and the stator 4.

The freon compressor comprises a compressor device and an electromotor device. The electromotor device is used for driving the compressor device and consists of a stator and a rotor rotating within the stator. The stator further consists of a stator core and stator windings wired on the stator core. Because a three-phase sine alternate current waveform is applied to the stator windings, an approximately circular rotary magnetic field is generated in the electromotor device, and due to the circular rotary magnetic field, the magnetic lines of force of the electromotor device are stabilized in space and time and noise is significantly reduced.

Furthermore, the rotor further comprises a rotor core and a plurality of permanent magnets formed within the rotor core, and therefore, the shape and locations of the magnets can be easily and freely set, such that the distribution of the magnetic lines of forces becomes smoother, avoiding noises in advance. The permanent magnets are arranged in a substantially rectangular configuration, or divided into four sets of parallel permanent magnets and the four sets of the parallel permanent magnets are arranged on the rotor core, so that the magnets are easily utilized. In particular, the shape of the magnets is not restricted in fact. On design demand, four substantially rectangular-shape magnets, or four or eight arc-shape magnets, can be formed on the rotor. The permanent magnets can be magnets made from rare-earth elements, or ferrite. Therefore, strengthened magnetic lines of force can be formed in the rotor and the stator, by which an electromotor with high efficiency, high power and low noise can be fabricated.

The rotor further comprises a rotor core and a plurality of permanent magnets arranged on the surface of the rotor core, and by applying a three-phase sine AC waveform on the stator, it can prevent the distribution of the magnetic lines of forces becoming not uniform, for reducing noise. In addition, the stator core of the stator further comprises at least six to twelve slots thereon, and the stator windings are directly wired on the slots. Compared with that the windings are not wired directly on the slots, the wiring length is shortened as the turns of the windings are the same.

A freon absorbed and compressed by the compressor device can be an HFC freon or a natural freon. Compared with the freon usage in prior art, because the present invention is driven by the three-phase sine AC waveform, even if the compression ratio is higher, making the load and noise of the electromotor become larger, overall noise can be reduced.

The compressor device further comprises a rolling piston or a pump combining a pair of eddy devices, so the noise is easily transmitted outwards. However, by applying the three-phase sine AC waveform, the noise can be reduced. In addition, a reciprocating piston can be installed in the compressor device and as the electromotor is further driven by applying the three-phase sine AC waveform, the noise can be significantly reduced.

Moreover, according to the present invention, since the positions of the permanent magnets are not detected by a position sensor, the structure of the freon compressor can be further simplified, so the assembling efficiency of the freon compressor increases significantly.

Furthermore, because the three-phase sine alternating current waveform, according to the present invention, is obtained by performing a quasi-sine wave pulse width modulation on a direct current (DC) power source, the three-phase sine alternating current waveform can be obtained by superposing a third high harmonic wave thereon and then performing the quasi-sine wave pulse width modulation, and therefore, the electromotor device can be operated smoothly to reduce noise.

Furthermore, the three-phase sine alternating current waveform is applied to control a torque for keeping a constant rotation speed of the rotor, and even though the load torque of the electromotor per rotation is not constant due to the freon absorbed and compressed in the freon compressor, and the rotational speed of the rotor may vary, the rotational speed of the electromotor is still kept constant.

In addition, because two to six magnetic poles can be formed in the rotor, the manufacturing cost for the electromotor device is reduced. For example, if an electromotor device using a four-pole structure with high cost is converted to an electromotor device using a two-pole structure, the cost is further reduced. In addition, the slots of the stator can be six to twelve in order to get a better assembly for the windings of a direct wired electromotor device.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. A freon compressor, comprising:
    a compressor device; and
    an electromotor device for driving the compressor device, the electromotor device consisting of a stator and a rotor rotating within the stator,
    wherein the rotor further comprises a rotor core and a plurality of permanent magnets substantially arranged in a rectangular configuration formed within the rotor core and the stator consists of a stator core and stator windings wired directly on the stator core where a three-phase sine alternating current waveform is applied to the stator winding.

2. The freon compressor of claim 1, wherein the rotor further comprises a rotor core and a plurality of permanent magnets formed within the rotor core.

3. The freon compressor of claim 2, wherein the permanent magnets are substantially arranged in a rectangular configuration.

4. The freon compressor of claim 2, wherein the permanent magnets are divided into four sets of parallel permanent magnets and the four sets of the parallel permanent magnets are arranged on the rotor core.

5. The freon compressor of claim 1, wherein the rotor further comprises a rotor core and a plurality of permanent magnets arranged on the surface of the rotor core.

6. The freon compressor of claim 2, wherein the permanent magnets are magnets made from rare-earth elements.

7. The freon compressor of claim 2, wherein the permanent magnets are magnets made from ferrites.

8. The freon compressor of claim 1, wherein the stator core of the stator further comprises at least six to twelve slots thereon, and the stator windings are directly wired on the slots.

9. The freon compressor of claim 1, wherein a freon absorbed and compressed by the compressor device comprises a HFC freon.

10. The freon compressor of claim 1, wherein the a freon absorbed and compressed by the compressor device comprises a nature freon.

11. The freon compressor of claim 1, wherein the compressor device further comprises a rolling piston.

12. The freon compressor of claim 1, wherein the compressor device further comprises a pump combined a pair of eddy devices.

13. The freon compressor of claim 1, wherein the compressor device further comprises a reciprocating piston.

14. The freon compressor of claim 1, wherein positions of the permanent magnets are not detected by a position sensor.

15. The freon compressor of claim 1, wherein the three-phase sine alternating current waveform is obtained by performing a quasi-sine wave pulse width modulation on a direct current (DC) power source.

16. The freon compressor of claim 15, wherein the three-phase sine alternating current waveform is obtained by superposing a third high harmonic wave thereon and then performing a quasi-sine wave pulse width modulation.

17. The freon compressor of claim 1, wherein the three-phase sine alternating current waveform is applied to control a torque for keeping a constant rotation speed of the rotor.

18. The freon compressor of claim 1, wherein the rotor comprises two to six magnetic poles.

* * * * *